US008245313B2

(12) United States Patent
Ohta et al.

(10) Patent No.: US 8,245,313 B2
(45) Date of Patent: Aug. 14, 2012

(54) DOCUMENT MANAGEMENT SYSTEM, DOCUMENT MANAGEMENT PROGRAM, DOCUMENT MANAGEMENT SYSTEM CONFIGURATION METHOD, AND SERVER COMPUTER

(75) Inventors: Tadahide Ohta, Tokyo (JP); Hirotoshi Katsume, Tokyo (JP); Yumiko Kurotaki, Tokyo (JP); Keiji Masunaga, Tokyo (JP)

(73) Assignee: Honda Motor Co., Ltd, Tokyo (JP)

( * ) Notice: Subject to any disclaimer, the term of this patent is extended or adjusted under 35 U.S.C. 154(b) by 1213 days.

(21) Appl. No.: 11/887,119

(22) PCT Filed: Mar. 20, 2006

(86) PCT No.: PCT/JP2006/305557
§ 371 (c)(1),
(2), (4) Date: Sep. 25, 2007

(87) PCT Pub. No.: WO2006/109447
PCT Pub. Date: Oct. 19, 2006

(65) Prior Publication Data
US 2009/0015861 A1      Jan. 15, 2009

(30) Foreign Application Priority Data

Mar. 31, 2005   (JP) ................................ 2005-102467

(51) Int. Cl.
*G06F 3/12*   (2006.01)
(52) U.S. Cl. ............................ 726/32; 715/210; 709/225
(58) Field of Classification Search .................... 726/32; 715/210; 709/225
See application file for complete search history.

(56) References Cited

U.S. PATENT DOCUMENTS

| 6,839,466 B2 * | 1/2005 | Venable .......................... 382/199 |
| 7,562,141 B2 * | 7/2009 | Tsuyama et al. ............... 709/225 |
| 2001/0013097 A1 * | 8/2001 | Ito et al. ......................... 713/176 |
| 2001/0029513 A1 * | 10/2001 | Kuwano et al. ................ 707/522 |

FOREIGN PATENT DOCUMENTS

| JP | 2001-051905 | 2/2001 |
| JP | 2001-344557 | 12/2001 |
| JP | 2002-197101 | 7/2002 |
| JP | 2003-067250 | 3/2003 |

\* cited by examiner

*Primary Examiner* — Jeffrey Pwu
*Assistant Examiner* — Samuel Ambaye
(74) *Attorney, Agent, or Firm* — Squire Sanders (US) LLP

(57) ABSTRACT

There is provided a system or the like capable of managing a document not printed on a paper medium so that an administrator of the document may be identified. According to the document management system of the present invention, a first processing unit 110 recognizes an identifier to identify a user or a department to which the user belongs. Moreover, a second processing unit 120 recognizes a document specified by the user. Then, an image processing unit 130 prepares an image including the specified document recognized by the first processing unit 110 and the identifier recognized by the second processing unit 120 while adjusting the arrangement of the identifier and the specified document, and causes an information processing terminal 200 to display the image. Thus, when the document displayed on the information processing terminal 200 is photographed, the identifier is also photographed, therefore, if the photograph is copied illegally and distributed, the document leak source can be identified based on the identifier.

18 Claims, 5 Drawing Sheets

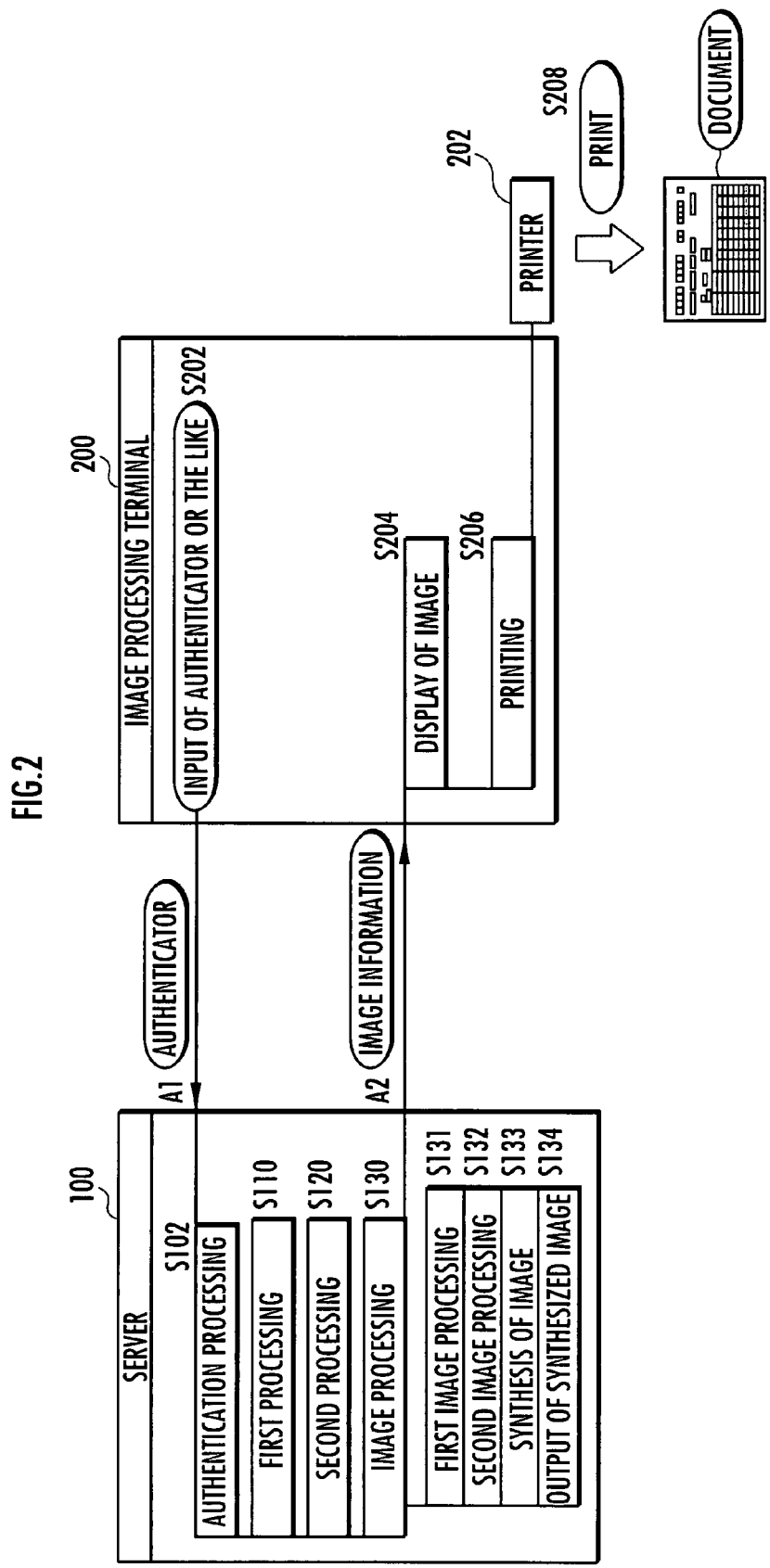

DOCUMENT MANAGEMENT SYSTEM, DOCUMENT MANAGEMENT PROGRAM, DOCUMENT MANAGEMENT SYSTEM CONFIGURATION METHOD, AND SERVER COMPUTER

TECHNICAL FIELD

The present invention relates to a system for managing a document displayed on an information processing terminal, a program for providing the management function to a computer, a method for configuring the system, and a server computer for performing the method (hereinafter referred to as "server" as appropriate).

BACKGROUND ART

Conventionally, a technique for printing document data and imprint data on a piece of paper has been proposed (see e.g., Japanese Patent Laid-Open No. 2001-344557) so that an administrator of the document may be identified to prevent illegal copy and distribution of documents.

DISCLOSURE OF THE INVENTION

Problems to be Solved by the Invention

However, when the document has not been printed on a paper medium, for example, when the document has been displayed as an image on an information processing terminal such as a personal computer, if the document is photographed by a camera and copied illegally, imprint data does not appear on the photographed document, therefore, the document leak source cannot be identified.

Consequently, a problem to be solved in the present invention is to provide a system and a program capable of managing a document not printed on a paper medium so that an administrator of the document can be identified.

Means to Solve the Problems

A document management system of the present invention to solve the problem is characterized by comprising a first processing unit for recognizing a document specified by a user, a second processing unit for recognizing an identifier to identify the user or a department to which the user belongs, and an image processing unit for preparing an image including the specified document recognized by the first processing unit and the identifier recognized by the second processing unit while adjusting the arrangement of the specified document and the identifier, and for causing an information processing terminal to display the image.

According to the document management system of the present invention, an image including the identifier to identify the user or a department to which the user belongs, as well as the document specified by the user, is displayed on the information processing terminal. When the document displayed on the information processing terminal is photographed, the identifier is also photographed. Accordingly, even if the photograph is copied illegally and distributed, the document leak source can be identified based on the identifier. In other words, together with the document, the identifier is displayed as a stamp to identify an individual or an organization, and thus, the mind may be inhibited from attempting to make such illegal copies. Further, since the arrangement of the document and the identifier is adjusted, the image in which the document and the identifier are appropriately arranged according to the difficulty level of the identification of the document and the identifier and the like may be displayed on the information processing terminal.

Note that preparing an image is a concept that encompasses creating the image by processing basic information inputted from external equipment or searched from a database, memory or the like, as well as searching the image from the database, and reading the image from a recording medium such as memory.

In addition, the document management system of the present invention is characterized in that an image processing unit comprises a first image processing unit for preparing a first image containing the document recognized by the first processing unit, a second image processing unit for preparing a second image containing the identifier recognized by the second processing unit, an image synthesizing unit for synthesizing the first image prepared by the first image processing unit and the second image prepared by the second image processing unit, and an image output unit for displaying the image synthesized by the image synthesizing unit on the information processing terminal.

According to the document management system of the present invention, the "first image" containing the document specified by the user and the "second image" containing the identifier to identify the user or the like are synthesized while the arrangement of the identifier and the specified document is being adjusted as described above. Then, the synthesized image is displayed on the information processing terminal. Thus, as described above, when the document displayed on the information processing terminal is photographed, the identifier is also photographed. Accordingly, even if the photograph is copied illegally and dispersed, the document leak source can be identified based on the identifier. In other words, together with the document, the identifier is displayed as a stamp to identify an individual or an organization, and thus, the mind may be inhibited from attempting to make such illegal copies.

Moreover, the document management system of the present invention is characterized in that the image processing unit prepares an image without overlap between the document recognized by the first processing unit and the identifier recognized by the second processing unit.

According to the document management system of the present invention, since an overlap between the document and the identifier in the image displayed on the information processing terminal is prevented, the identification of the document and the identifier becomes easier for the user.

Moreover, the document management system of the present invention is characterized in that the image processing unit prepares an image with partial overlap between the document recognized by the first processing unit and the identifier recognized by the second processing unit.

According to the present invention, the document and the identifier partially overlap in the photograph of the document or copy of the photograph displayed on the information processing terminal. This makes the deletion or erasing of the identifier from the photograph of the document or copy of the photograph difficult, and thus it is possible to avoid a situation where the copy of the document or the like from which the identifier has been deleted is dispersed so that the document leak source cannot be identified.

In addition, the document management system of the present invention is characterized in that the image processing unit prepares an image in which the relative arrangement of the document and the identifier dynamically changes.

According to the document management system of the present invention, the attention of the user can be directed to the identifier attached to the document in the image displayed on the information processing terminal. This can make the user aware of the fact that when this image is photographed, not only the document but also the identifier will be imaged, and that if the shot photograph or the like is used illegally, the identity will be discovered. This may inhibit the mind from attempting to photograph and copy the document and use it illegally.

Further, the document management system of the present invention is characterized in that the image processing unit prepares an image in which the design of the document recognized by the first processing unit or the characters included in the document and the design of the identifier recognized by the second processing unit or the characters included in the identifier are different from each other.

According to the document management system of the present invention, in the image displayed on the information processing terminal, the design of the document or the characters included in the document and the design of the identifier or the characters included in the identifier are differentiated from each other. Here, "design" means a shape, a pattern, a color and any combination thereof, and in addition is a concept that encompasses static as well as dynamic objects. "Color" is represented by "hue", "saturation" and "brightness". As a result, the identification of the document and the identifier in the image displayed on the information processing terminal becomes easier for the user.

In addition, the document management system of the present invention is characterized in that the image processing unit evaluates the degree of overlap between the document recognized by the first processing unit and the identifier recognized by the second processing unit, and, based on the degree of overlap, prepares an image in which the design of the document or the characters included in the document and the design of the identifier or the characters included in the identifier are different from each other.

According to the document management system of the present invention, each design of the document and the identifier in the image displayed on the information processing terminal is adjusted according to "the degree of overlap" between the document and the identifier. As a result, in view of the tendency of their identification to become more difficult the larger the degree of overlap between the document and the identifier, an image in which the design of the document and the design of the identifier are appropriately differentiated is displayed, and the identification of the document and the identifier becomes easier for the user.

Moreover, the document management system of the present invention is characterized in that the image processing unit prepares an image in which the brightness of the identifier becomes higher than that of the specified document the higher the evaluated degree of overlap.

According to the document management system of the present invention, in view of the tendency of their identification to become more difficult the larger the degree of overlap between the document and the identifier, the brightness of the identifier and the brightness of the document are differentiated, and thus, the identification of the document and the identifier in the image displayed on the information processing terminal becomes easier for the user.

In addition, the document management system of the present invention is characterized in that the image processing unit evaluates the surface area of the overlap between a first area containing the document and a second area containing the identifier in the image as the degree of overlap between the document and the identifier.

According to the document management system of the present invention, the surface area of overlap between the first area containing the document and the second area containing the identifier in the image displayed on the information processing terminal is evaluated as the degree of overlap.

Moreover, the document management system of the present invention is characterized in that the image processing unit evaluates the number of overlapping pixels between a first group of pixels occupied by the document and a second group of pixels occupied by the identifier, among groups of pixels constituting the image, as the degree of overlap between the identifier and the specified document.

According to the document management system of the present invention, the number of overlapping pixels between the first group of pixels occupied by the document and the second group of pixels occupied by the identifier, among groups of pixels constituting the image displayed on the information processing terminal, is evaluated as the degree of overlap.

In addition, the document management system of the present invention is characterized in that the image processing unit recognizes the level of importance of the document recognized by the first processing unit, and, based on the level of importance, adjusts the design of the document or the characters included in the document and the design of the identifier recognized by the second processing unit or the characters included in the identifier to prepare an image.

According to the document management system of the present invention, through difference of design of the document or the like included in the image displayed on the information processing terminal, the user can be made to recognize the level of importance of the document in view of the confidentiality.

Further, the document management system of the present invention is characterized by further comprising an authentication processing unit for authenticating a user, wherein the first processing unit recognizes the document specified by a user only when the user is authenticated by the authentication processing unit.

According to the document management system of the present invention, the confidentiality of the document is ensured because the image including the document can be displayed on the information processing terminal only when the user is authenticated.

Further, the document management system of the present invention is characterized in that the second processing unit searches from the database and recognizes an identifier corresponding to an authenticator used for the authentication processing unit to authenticate the user.

According to the document management system of the present invention, an image including the identifier corresponding to the authenticator used for the authentication of the user and the document is displayed on the information processing terminal.

In addition, the document management system of the present invention is characterized in that the image processing unit makes the identifier recognized by the second processing unit to be included in a printed material by printing equipment connected to the information processing terminal, and including the document recognized by the first processing unit.

According to the document management system of the present invention, the leak source of the document included in the printed material by the printing equipment can be identified based on the identifier included in the printed material, just as with conventional document management systems.

Moreover, the document management system of the present invention is characterized in that the system is constituted by a server computer capable of communicating with the information processing terminal through a network.

According to the document management system of the present invention, the confidentiality of the documents included in the images displayed on many information processing terminals can be collectively managed using network communication.

Further, the document management system of the present invention is characterized in that the system is constituted by a computer that the information processing terminal has.

According to the document management system of the present invention, the confidentiality of the documents included in the images displayed on the information processing terminals can be managed individually by each information processing terminal.

A document management program of the present invention to solve the problem is characterized by providing to a computer a first processing function for recognizing a document specified by a user, a second processing function for recognizing an identifier to identify the user or a department to which the user belongs, and an image processing function for preparing an image including the specified document recognized by the first processing function and the identifier recognized by the second processing function while adjusting the arrangement of the specified document and the identifier, and for causing an information processing terminal to display the image.

According to the document management program of the present invention, a function for managing the document can be provided to the computer, so that, when the document displayed on the information processing terminal is photographed, the identifier is also photographed, therefore, if the photograph is copied illegally and distributed, the document leak source can be identified based on the identifier.

The document management system configuration method of the present invention to solve the problem is characterized by downloading a portion or the entirety of the document management program into the computer in order to constitute the document management system.

According to the method of the present invention, a function serving as the document management system may be provided to the computer with any timing such as when there is a request from the user or the information processing terminal.

A server of the present invention to solve the problem is characterized by performing the method.

According to the server of the present invention, a portion or the entirety of the document management program may be downloaded into the computer with any timing.

BRIEF DESCRIPTION OF THE DRAWINGS

FIG. 2 is an explanatory diagram of the function of the document management system of the present invention;

BEST MODE FOR CARRYING OUT THE INVENTION

Embodiments of a document management system, a document management program, a document management system configuration method and a server of the present invention will be described with reference to the drawings.

Figure 1:
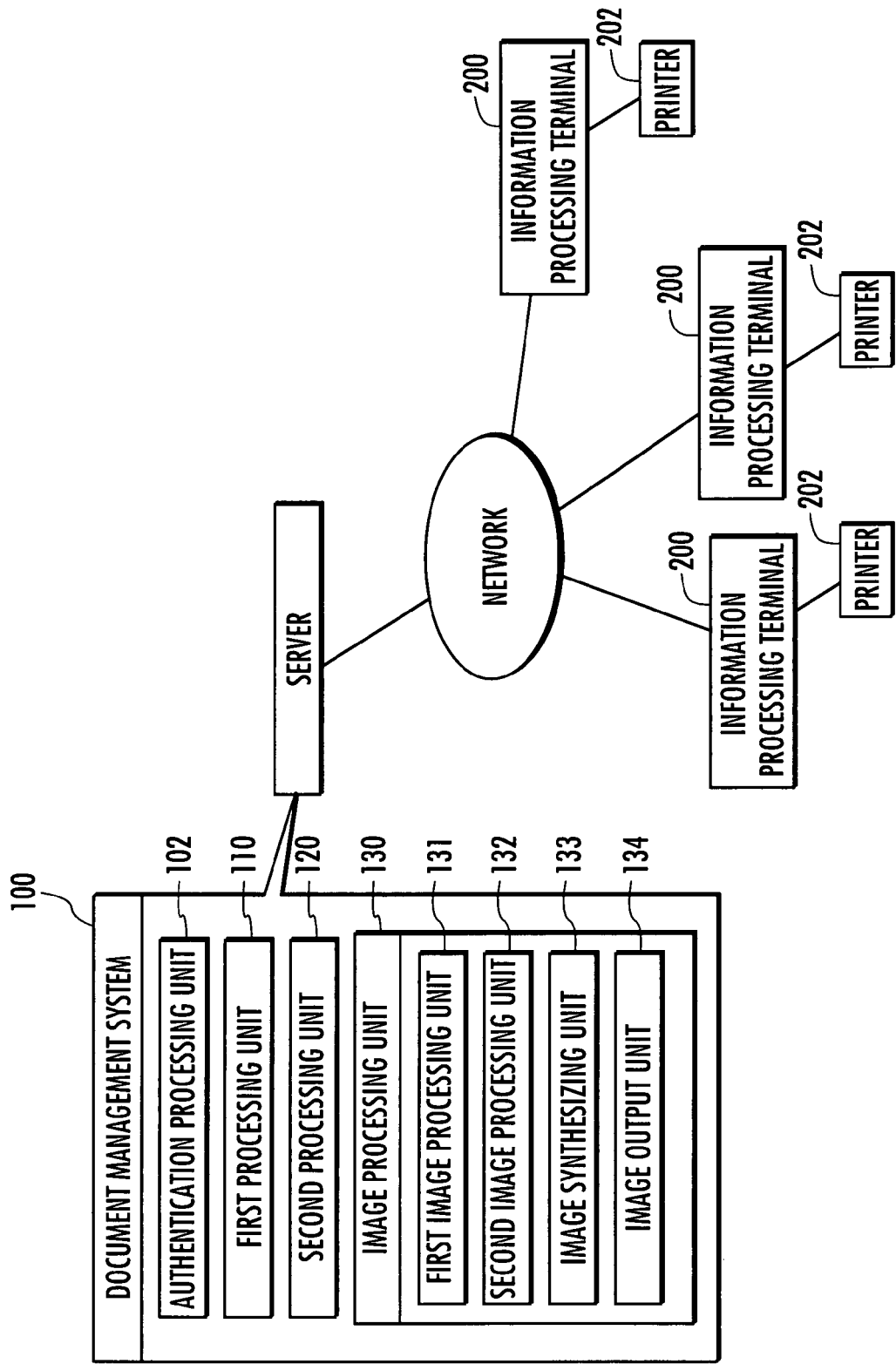
FIG. 1 is an illustrative diagram of the configuration of a document management system of the present invention.

The document management system 100 shown in FIG. 1 is comprised of a server (constituted by CPU, ROM, RAM, I/O or the like) serving as hardware, and a "document management program" of the present invention serving as software, which is stored in the ROM (memory) and provides functions to the server (or its CPU). The document management program may have been stored in the memory of the server from the beginning, or a portion or the entirety thereof may be downloaded from another server with any timing such as when there is a request from the server. The server has a function for communicating with an information processing terminal 200 through a network.

The document management system 100 comprises an authentication processing unit 102, a first processing unit 110, a second processing unit 120 and an image processing unit 130.

The authentication processing unit 102 recognizes an authenticator (password, user ID or combination thereof) that is inputted into the information processing terminal 200 through communication therewith, and authenticates the user based on the authenticator.

The first processing unit 110 recognizes a document specified by the user.

The second processing unit 120 recognizes an identifier such as an identification number or an identification mark to identify the user of the information processing terminal 200 or a department to which the user belongs.

The image processing unit 130 comprises a first image processing unit 131, a second image processing unit 132, an image synthesizing unit 133 and an image output unit 134.

The first image processing unit 131 prepares a "first image" containing a document recognized by the first processing unit 110. The second image processing unit 132 prepares a second image containing an identifier recognized by the second processing unit 120. The image synthesizing unit 133 synthesizes the first image prepared by the first image processing unit 131 and the second image prepared by the second image processing unit 132. The image output unit 134 delivers the image synthesized by the image synthesizing unit 133 to the information processing terminal 200 for display.

The information processing terminal 200 is a personal computer, a mobile telephone, a PDA or the like having a function for displaying an image on a display. Among the information processing terminals 200, a portion or the entirety thereof are connected to a printer (printing equipment) 202.

The function of the document management system 100 having the above configuration will be described with reference to FIGS. 2 to 4.

First, an initial screen for viewing a document is displayed on the information processing terminal 200, and a user follows the initial screen to input an "authenticator" such as a password, an ID or the like into the information processing terminal 200 (FIG. 2/S202).

The authenticator is sent to the server from the information processing terminal 200 (FIG. 2/arrow A1), and the authentication processing unit 102 performs "authentication processing" of the user for viewing the document accordingly (FIG. 2/S102). More specifically, the authentication processing unit 102 authenticates the user, based on whether or not the authenticator is registered with or stored in a predetermined database or a storage device such as memory.

In addition, the first processing unit 110 performs "first processing" (FIG. 2/S110) provided that the user is authenticated by the authentication processing unit 102. More specifically, the first processing unit 110 searches from the database or another server and recognizes a document corresponding to the specification of the document sent from the information processing terminal 200 (specification of the location where the document resides on a network, such as URL specification) (see FIG. 2/arrow A1). "Recognizing" information or the like is a concept that encompasses all processes for preparing the information or the like for the execution of a subsequent process, such as storing the information or the like in memory such as a RAM.

In addition, the second processing unit 120 performs "second processing" (FIG. 2/S120) provided that the user is authenticated by the authentication processing unit 102 as with the first processing. More specifically, the second processing unit 120 searches from the database and recognizes an identifier such as an identification number corresponding to the authenticator sent from the information processing terminal 200 (see FIG. 2/arrow A1).

Then, the image processing unit 130 performs "image processing" (FIG. 2/S130).

Figure 3A:
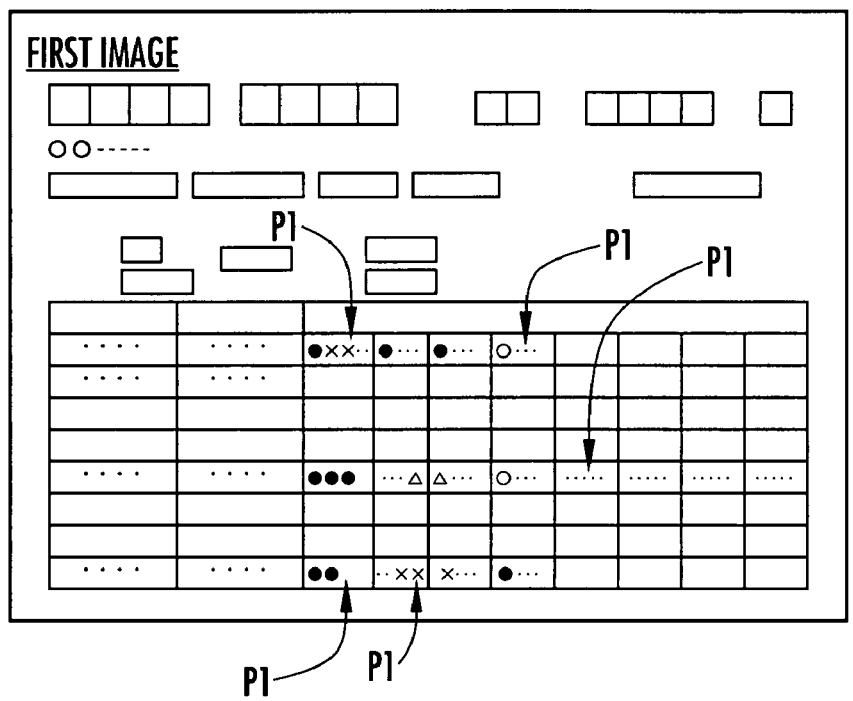
FIG. 3 is an illustrative diagram of a first image and a second image.

More specifically, the first image processing unit 131 performs "first image processing" for preparing a first image containing a document specified by the user, and recognized by the first processing unit 110 (FIG. 2/S131). As a result, the first image containing documents p1 is prepared as shown in FIG. 3(a).

Figure 3B:
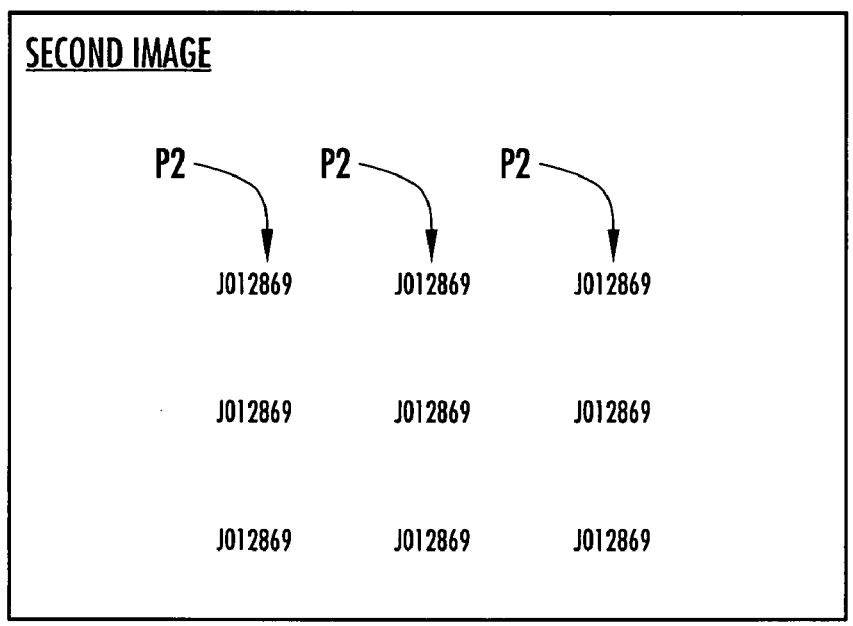

Further, the second image processing unit 132 performs "second image processing" for preparing a second image containing the identifier to identify the user or a department to which the user belongs (FIG. 2/S132). As a result, the second image containing identifiers p2 such as "J012869" is prepared as shown in FIG. 3(b).

In addition, the image synthesizing unit 133 overlays the first image prepared by the first image processing unit 131 on the second image prepared by the second image processing unit 132 for synthesis (FIG. 2/S133). The image synthesizing unit 133 overlays the first image on the second image while adjusting the arrangement of them so that the overlap between the individual documents p1 contained in the first image and the individual identifiers p2 contained in the second image is minimized. As a result, a synthesized image in which the documents p1 and the identifiers p2 do not overlap is prepared as shown in FIG. 4.

Then, the image output unit 134 sends the image synthesized by the image synthesizing unit 133 to the information processing terminal 200 from the server (FIG. 2/S134, arrow A2). Accordingly, an image in which the documents p1 and the identifiers p2 do not overlap as shown in FIG. 4 is displayed on the information processing terminal 200 (FIG. 2/S204).

In addition, in the synthesized image, the design of the characters included in the documents p1 and the design (which means a shape, a pattern, a color and any combination thereof, and includes static as well as dynamic design) of the characters included in the identifiers p2 are adjusted to be different from each other. For example, the characters included in the documents p1 are adjusted to be larger than the characters included in the identifiers p2. Further, the characters included in the documents p1 are adjusted to be darker (lower in brightness) than the characters included in the identifiers p2. In addition, the characters included in the documents p1 are adjusted to be black, while the characters included in the identifiers p2 are adjusted to be blue.

Figure 4:
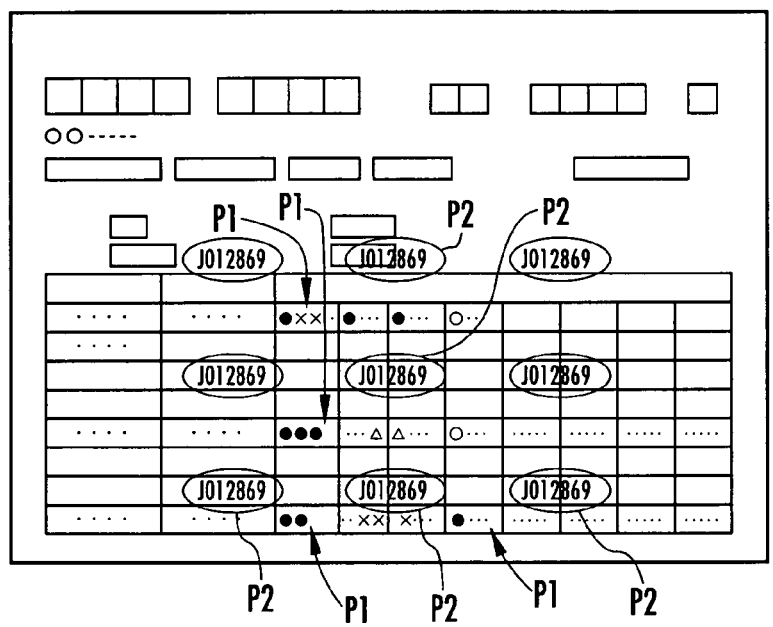
FIG. 4 is an illustrative diagram of a synthesized image of a first image and a second image.

In this situation, when the information processing terminal 200 performs "printing" according to print operation by the user (FIG. 2/S206) to cause the printer 202 to print the display screen image of the information processing terminal 200 (FIG. 2/S208), the image processing unit 130 causes the information processing terminal 200 to display the image so that the image shown in FIG. 4 is printed on a paper medium as is.

According to the document management system 100 exerting the function, an image including the identifiers p2 to identify the user or a department to which the user belongs, as well as the documents p1 specified by the user, is displayed on the information processing terminal 200 (see FIG. 4). When the documents p1 displayed on the information processing terminal 200 are photographed, the identifiers p2 are also photographed. Therefore, even if the photograph is copied illegally and distributed, the leak source of the documents p1 can be identified based on the identifier. In other words, together with the documents, the identifiers p2 are displayed as stamps to identify an individual or an organization, and thus, the mind may be inhibited from attempting to make such illegal copies.

In addition, since an overlap between the documents p1 and the identifiers p2 is prevented in the image displayed on the information processing terminal 200 (see FIG. 4), the identification of the documents p1 and the identifiers p2 becomes easier for the user.

In addition, an image in which the design of the characters included in the documents p1 and the design of the characters included in the identifiers p2 are different from each other is displayed on the information processing terminal 200 (see FIG. 4). As a result, the identification of the documents p1 and the identifier p2 in the image displayed on the information processing terminal 200 becomes easier for the user.

Further, the image processing unit 130 makes the documents p1 recognized by the first processing unit 110 to be included in a printed material by the printer 202 connected to the information processing terminal 200, and including the identifiers p2 recognized by the second processing unit 120. Consequently, the leak source of the documents p1 included in the printed material by the printer 202 can be identified based on the identifiers p2 included in the printed material.

In addition, the confidentiality of the documents p1 can be maintained because the documents p1 can be viewed through the information processing terminal 200 only when the user is authenticated based on an appropriate authenticator (see FIG. 2/S202, S204).

Note that, the document management server 100 is constituted by a server in the embodiment; however, as another embodiment, the document management system 100 may be constituted by one or more information processing terminals 200 in addition to the server or instead of the server.

In the embodiment, the first and second images are prepared, and overlapped to prepare an image including the documents p1 and the identifiers p2 (FIG. 3(a), FIG. 3(b), FIG. 4); however, as another embodiment, an image may be prepared (created) that includes the documents p1 and the identifiers p2 without preparing the first and second images.

Figure 5:
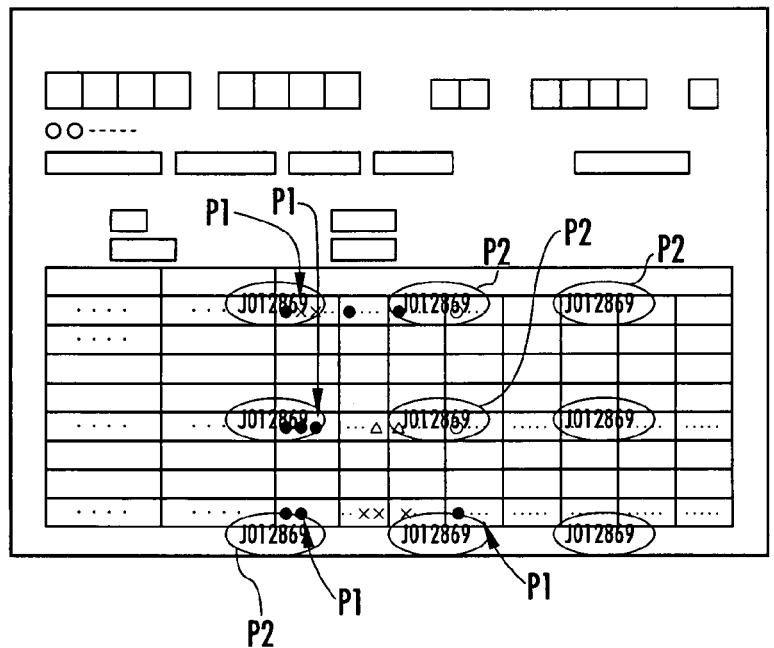
FIG. 5 is another illustrative diagram of a synthesized image of a first image and a second image.

In the embodiment, an image is synthesized in which the documents p1 and the identifiers p2 do not overlap as shown in FIG. 4; however, as another embodiment, an image may be synthesized in which the documents p1 and the identifiers p2 partially overlap as shown in FIG. 5.

According to the document management system 100 of the other embodiment, on the photograph or copy of the photograph of the documents p1 displayed on the information processing terminal 200, the documents p1 and the identifiers p2 partially overlap. This makes the deletion or erasing of the identifiers from the photograph or copy of the photograph of the documents p1 difficult, and thus it is possible to avoid a situation where the copy of the documents p1 from which the identifiers p2 have been deleted is dispersed so that the document leak source cannot be identified.

In addition, the image processing unit 130 may prepare an image in which the relative position of the documents p1 and the identifiers p2 dynamically changes.

According to the document management system 100 of the embodiment, the attention of the user can be directed to the identifiers p2 attached to the documents p1 in the image displayed on the information processing terminal 200 (see FIG. 4). This can make the user be aware of the fact that when this image is photographed, not only the documents p1 but also the identifiers p2 will be imaged, and that if the shot photograph or the like is used illegally, the identity will be discovered. This may inhibit the mind from attempting to photograph and copy the documents p1 and use them illegally.

Further, the image processing unit 130 may evaluate the degree of overlap between the document recognized by the first processing unit 110 and the identifier recognized by the second processing unit 120, and, based on the degree of overlap, prepare an image in which each design of the identifier and the specified document is different.

According to the document management system of the embodiment, the design of characters included in the documents p1 and the design of characters included in the identifiers p2 in the image displayed on the information processing terminal 200 are adjusted according to "the degree of overlap" between the documents p1 and the identifiers p2. For example, the brightness of the identifiers p2 is adjusted to become higher than that of the documents p1 the larger the degree of overlap. As a result, in view of the tendency of their identification to become more difficult the larger the degree of overlap, an image in which the design of the documents p1 and the design of the identifiers p2 are appropriately differentiated is displayed. Then, the identification of the documents p1 and the identifier p2 in the image displayed on the information processing terminal 200 becomes easier for the user.

Figure 6A:
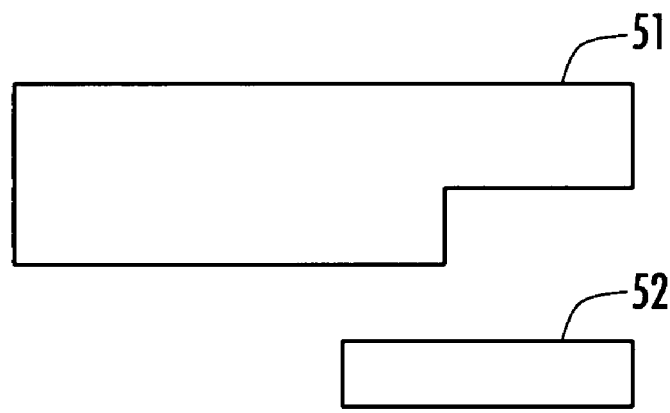
FIG. 6 is an explanatory diagram of the degree of overlap between a document and an identifier.
Figure 6B:
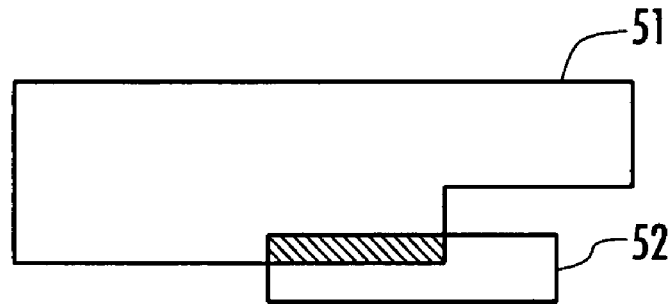
Figure 6C:
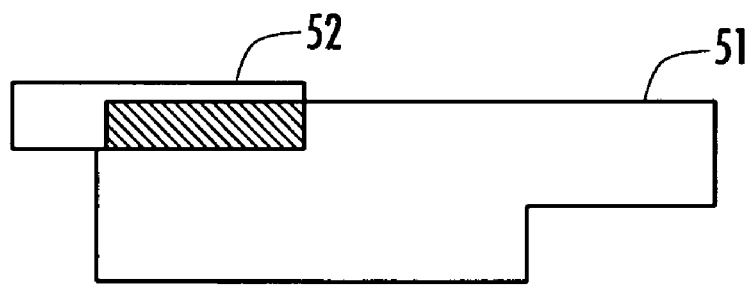

The degree of overlap is evaluated by the sum of the surface area of overlap between the first area containing the individual documents p1 contained in the first image and the second area containing the individual identifiers p2 contained in the second image. For example, If the first area 51 and the second area 52 do not overlap as shown in FIG. 6(a) throughout the entire image, the degree of overlap is evaluated as "0". Further, when the first area 51 and the second area 52 overlap as shown in FIG. 6(b) and FIG. 6(c), the degree of overlap is evaluated according to the size of the surface area of the overlap portion (shaded portion). When the surface area of the overlap between the first area 51 and the second area 52 in FIG. 6(c) is larger than the surface area of the overlap between the first area 51 and the second area 52 in FIG. 6(b), the degree of overlap in FIG. 6(c) is evaluated to be higher than that in FIG. 6(b).

In addition, the image processing unit 130 may evaluate the number of overlapping pixels between a first group of pixels occupied by the documents p1 and a second group of pixels occupied by the identifiers p2, among groups of pixels constituting the image, as the degree of overlap between them.

Further, the image processing unit 130 may recognize the level of importance of the document recognized by the first processing unit 110 by searching a database, for example, and, based on the level of importance, adjust the design of the documents p1 or the identifiers p2.

According to the document management system of the embodiment, through the design of the documents p1 or the design of the identifiers p2 included in the image displayed on the information processing terminal 200, the user can be made to recognize the level of importance of the documents p1 in view of the confidentiality.

The invention claimed is:

1. A document management system to manage a document displayed on an information processing terminal, comprising:
    a first processing unit configured to recognize a document specified by a user;
    a second processing unit configured to recognize an identifier to identify the user or a department to which the user belongs; and
    an image processing unit configured to prepare a combined image as a single image including the specified document recognized by the first processing unit and the identifier recognized by the second processing unit while adjusting the arrangement so as to lessen an overlap of the specified document and the identifier on the single image, and configured to enable the information processing terminal to display the single image, wherein the image processing unit comprises:
    a first image processing unit configured to prepare a first image containing the document recognized by the first processing unit,
    a second image processing unit configured to prepare a second image containing the identifier recognized by the second processing unit,
    an image synthesizing unit configured to synthesize the first image prepared by the first image processing unit and the second image prepared by the second image processing unit; and
    an image output unit configured to enable the information processing terminal to display the image synthesized by the image synthesizing unit.

2. The document management system according to claim 1, wherein the image processing unit perpares an image without an overlap between the document recognized by the first processing unit and the identifier recognized by the second processing unit.

3. The document management system according to claim 1, wherein the image processing unit prepares an image with partial overlap between the document recognized by the first processing unit and the identifier recognized by the second processing unit.

4. The document management system according to claim 1, wherein the image processing unit prepares an image in which the relative arrangement of the document and the identifier dynamically changes.

5. The document management system according to claim 1, wherein the image processing unit prepares an image in which a design of the document recognized by the first processing unit or the characters contained in the document and a design of the identifier recognized by the second processing unit or the characters contained in the identifier are different from each other.

6. The document management system according to claim 1, wherein the image processing unit evaluates a degree of overlap between the document recognized by the first processing unit and the identifier recognized by the second processing unit, and, based on the degree of overlap, prepares an image in which the design of the document or the characters contained in the document and the design of the identifier or the characters contained in the identifier are different from each other.

7. The document management system according to claim 6, wherein the image processing unit prepares an image in which a brightness of the identifier becomes higher than that of the document the higher the evaluated degree of overlap.

8. The document management system according to claim 6, wherein the image processing unit evaluates a surface area of the overlap between a first area containing the document and a second area containing the identifier in the image as the degree of overlap between the document and the identifier.

9. The document management system according to claim 6, wherein the image processing unit evaluates the number of overlapping pixels between a first group of pixels occupied by the document and a second group of pixels occupied by the identifier, among groups of the pixels constituting an image, as the degree of overlap between the specified document and the identifier.

10. The document management system according to claim 1, wherein the image processing unit recognizes a level of importance of the document recognized by the first processing unit, and, based on the level of importance, adjusts the design of the document or the characters contained in the document and the design of the identifier recognized by the second processing unit or the characters contained in the identifier to prepare an image.

11. The document management system according to claim 1, further comprising:
an authentication processing unit configured to authenticate a user, wherein the first processing unit recognizes the document specified by a user only when the user is authenticated by the authentication processing unit.

12. The document management system according to claim 11, wherein the second processing unit searches from the database and recognizes an identifier corresponding to an authenticator used for the authentication processing unit to authenticate a user.

13. The document management system according to claim 1, wherein the image processing unit makes the identifier recognized by the second processing unit to be included in a printed material by printing equipment connected to the information processing terminal, and including the document recognized by the first processing unit.

14. The document management system according to claim 1, wherein the system is constituted by a server computer capable of communicating with the information processing terminal through a network.

15. The document management system according to claim 1, wherein the system is constituted by a computer that the information processing terminal has.

16. A document management program, which provides to a computer functions for managing a document displayed on an information processing terminal, characterized by providing a computer with:
a first processing function for recognizing a document specified by a user;
a second processing function for recognizing an identifier to identify the user or a department to which the user belongs; and
an image processing function for preparing a combined image as a single image including the specified document recognized by the first processing function and the identifier recognized by the second processing function while adjusting the arrangement so as to lessen an overlap of the specified document and the identifier on the single image, and for causing the information processing terminal to display the single image, wherein the image processing function comprises:
preparing a first image containing the document recognized by the first processing function,
preparing a second image containing the identifier recognized by the second processing function,
synthesizing the first image prepared by the first image processing function and the second image prepared by the second image processing function, and
enabling the information processing terminal to display a synthesized image.

17. A method of configuring a document management system, said method comprising:
loading a document management program on a computer system, said document management program being embodied on a non-transitory computer readable medium and controlling a computer to perform
a first processing function for recognizing a document specified by a user,
a second processing function for recognizing an identifier to identify the user or the department to which the user belongs; and
an image processing function for preparing a combined image as a single image including the specified document recognized by the first processing function and the identifier recognized by the second processing function while adjusting the arrangement so as to lessen an overlap of the specified document and the identifier on the single image, and for causing the information processing terminal to display the single image,
wherein the computer system implementing these functions comprises a document management system, and
wherein the image processing function comprises:
preparing a first image containing the document recognized by the first processing function,
preparing a second image containing the identifier recognized by the second processing function,
synthesizing the first image prepared by the first image processing function and the second image prepared by the second image processing function, and
enabling the information processing terminal to display a synthesized image.

18. A server computer characterized by performing the method according to claim 17.

* * * * *